Patented Apr. 18, 1944

2,346,755

UNITED STATES PATENT OFFICE 2,346,755

EMULSION COMPOSITION

Charles B. Hemming, Parlin, N. J., assignor to E. I. du Pont de Nemours & Company, Wilmington, Del., a corporation of Delaware No Drawing. Application May 17, 1941, Serial No. 393,935

7 Claims. (Cl. 260—17)

This invention relates to emulsions of organic polymers suitable for use as coatings or adhesives and more particularly to emulsions which produce highly water-resistant coatings on evaporation of the water, especially when followed by mild baking.

Several types of emulsions have been utilized in the paint, lacquer and adhesives industry. The oil in water type, that is, one where the organic polymer is dispersed in the water phase, has proven to be of most commercial importance. Subclasses include those where the organic polymer is dissolved in a suitable organic solvent or solvent mixture and the solution is dispersed in the water phase, and those where the solid polymer is dispersed in the water phase without the aid of solvents, although minor quantities of liquid plasticizers, solvents or other modifiers may be present. The dispersion of solid polymers can be accomplished in several ways including the highly efficient commercial colloid mills of Plauson and others. A further class includes the emulsification of a liquid monomer in the water phase and then polymerizing the monomer to the polymeric form without the breaking of the primary emulsion.

It is fundamental in the formation of emulsions of the oil in water type to have present emulsifying agents and also normally a bodying agent is introduced to improve and stabilize the emulsion. These agents are soluble in the water phase and when the emulsion has been applied to the surface to be coated and dried the water-soluble materials remain in the film or coating, and as a result the coatings are affected by water and in some cases re-emulsification readily takes place. When the polymeric material is fusible, it is often possible to improve the water-resistance of the coating prepared from emulsions of solid polymers by heating sufficiently to fuse and further coalesce the polymer into a homogeneous coating. This procedure normally does not completely free the coating from its water sensitivity. Emulsions prepared from solutions of organic polymers are normally less sensitive to water due to the coalescing effects of the solvents.

It is an object of this invention to provide a means of more completely waterproofing a coating deposited from the emulsion form. A further object is the provision of emulsion compositions which when applied and the water expelled, will yield coatings highly resistant to re-emulsification and to softening or marring when water is brought in contact with them. A further object is the provision of adhesive and coating compositions of increased usefulness. A still further object is the provision of a new and improved means of waterproofing organic polymer compositions deposited from emulsions.

This invention is primarily concerned with emulsions of organic polymers in which polyvinyl alcohol is used as the bodying agent and in preferred cases as the sole emulsifying and bodying agent to which has been added a complex of the Werner type in which a trivalent chromium atom is coordinated with a carboxylic acido group having at least 10 carbon atoms.

According to the Werner theory, atoms may exert auxiliary valences as well as the principal valences occurring in simple compounds. These auxiliary valences may act to hold various groups to the atom exerting them, and the atom exerting the principal and auxiliary valences may become the nuclear atom of a complex compound or complex ion.

With particular reference to chromium it has been found that the total number of groups which may be held within the complex by the combined principal and auxiliary valences is six. The groups so held are referred to as "coordinated groups" and chromium is said to have a "coordination number" of six. Other groups may also be associated with the chromium, but when this is the case such additional groups are present as ions and are outside of the chromi-nuclear complex. Moreover, there may be more than one chromi-nuclear atom within the complex, the chromium atoms being linked together by reason of being coordinated through common groups known as bridging groups. With respect to each chromium atom, each bridging group occupies but a single coordination position, so that an additional five coordination groups may be present on the atom.

The preparation and general description of Werner complexes of this type are included in co-pending application Serial No. 358,479, filed by R. K. Iler on September 26, 1940, now Patent No. 2,273,040. Stearato chromic chloride is the name assigned to an important and useful member of this new class of compositions. Compounds of this class are characterized by their solubility in certain organic solvents, particularly the lower aliphatic alcohols, and also in water. The unique combination of an active chromic salt and relatively high concentrations of long chain fatty acid groups in the same water-soluble molecule, have led to their value as waterproofing agents for paper, fabric, leather and other commercial water-sensitive materials. Unbelievably low concentrations have a pronounced waterproofing effect on paper.

The excellent combined emulsifying and bodying properties of polyvinyl alcohol, and its water-soluble derivatives in which appreciable hydroxyl groups remain as residues, have been recognized and disclosed for the preparation of metallic sols, the preparation of emulsions of many synthetic resins, the preparation of emulsions of cellulose derivatives, and the preparation of wax emulsions. It can be substituted for other hydrophilic bodying agents such as methyl cellulose, gum tragacanth and gum ghatti. Although the polyvinyl alcohol contains potentially reactive hydroxyl groups, it has been found extremely difficult to convert it to a hydrophobic substance by any simple treatment with chemicals such as formaldehyde, basic aluminum acetate, chrome alum, etc., all of which have been extensively used for waterproofing gelatin, casein, leather, etc. Acetylization, acylation and alkylation have been suggested as means of altering the hydrophilic properties, but the general schemes suggested have not been effective.

I have found that the Werner complex compounds of the type disclosed by Iler, can be introduced into emulsions containing small amounts of polyvinyl alcohol without appreciably affecting the stability or other working properties of the emulsion, that these emulsions can be stored if necessary and then when the emulsions are applied to surfaces and allowed to dry, a pronounced waterproofing effect is obtained which is in proportion in part to the concentration of the Werner complex and in part to the degree of heating or baking applied to the coated object or sheet.

*Example 1*

A composition prepared by emulsifying monomeric vinyl acetate in a dilute water solution of polyvinyl alcohol and subsequently polymerizing by heating after the addition of hydrogen peroxide, had the approximate composition of—

| | Parts by weight |
|---|---|
| Polymerized vinyl acetate | 57 |
| Polyvinyl alcohol | 3 |
| Water | 40 |
| | 100 | and a final viscosity of 300 centipoises at 28° C. This was modified to provide an adhesive of the desired characteristic as follows:

| | Parts by weight |
|---|---|
| Polyvinyl acetate emulsion | 86.4 |
| Dibutyl phthalate | 8.6 |
| Stearato chromic chloride 16% solution in methanol | 5.0 |
| | 100.0 |

The dibutyl phthalate, although insoluble in water, was easily incorporated by agitation probably because of the formation of an emulsion in the presence of the hydrophilic polyvinyl alcohol. A sample of the polyvinyl acetate emulsion as described was compared with a sample from which the stearato chromic chloride was omitted. In one test the samples were applied to glass plates and baked for one-half hour at 125° C. The films formed were coherent, tough and had only a very slight opacity. The film containing the stearato chromic chloride was found to be markedly harder and it showed better adhesion to the glass plate than the comparative material. When the plates were immersed in water the film without the stearato chromic chloride turned white immediately, and in about 30 seconds had softened to the extent that preliminary re-emulsification was underway. Partial rehardening of the film occurred when the water was evaporated, but the film had the translucency of ground glass.

The film containing the stearato chromic chloride was highly resistant to immersion and after 10 minutes showed only a slight trace of opalescence. No tendency of re-emulsification occurred even on prolonged soaking. A slight softening did take place but this effect was temporary and disappeared as soon as the film was dried. It was observed that the water was repelled from the surface of the stearato chromic chloride treated film.

In a second experiment the two samples were used to coat the back of a heavy pile carpet, where the object was to permanently secure the pile to the carpet base. After application the coated samples were dried for one-half hour at 125° C. Exposure of the dried film to a ½% soap solution for 20 minutes at 55° C. showed a great difference. The straight emulsion quickly turned white and after a few minutes had softened sufficiently to make it possible to remove the pile without difficulty. The stearato chromic chloride treated emulsion was substantially unaffected by the 20 minute treatment in the soap solution, so that while the untreated emulsion was useless as a carpet backing, the addition of the stearato chromic chloride produced a useful commercial adhesive coating composition.

In an additional test the two materials were applied as extremely thin coatings to a paperboard stock developed for the manufacture of milk containers. The coating was applied at the rate of approximately one pound of solid coating per thousand square feet of paper and was coated on both sides. Drying was carried out by heating to 235° F. for 40 seconds. The paper coated with the stearato chromic chloride treated emulsion withstood a four-day soaking in water at room temperature without disintegrating, while the untreated emulsion turned white immediately following the application of the water, and the base paper rapidly lost its stiffness and soon started to disintegrate.

Higher concentrations of the stearato chromic chloride gave good results but without marked improvement and lower concentrations gave definitely decreasing degrees of waterproofness. The practical range preferred as the result of experiment lies in the use of 20 to 70% of the stearato chromic chloride based upon the dry weight of the polyvinyl alcohol in the composition.

*Example 2*

An emulsion formed by colloiding water-wet nitrocellulose in a combination of plasticizers and volatile solvent and subsequently dispersing the colloid in a water phase containing polyvinyl alcohol had as its final composition

| | Parts by wt. | |
|---|---|---|
| Nitrocellulose (10 seconds—A. S. T. M. D-33-301, Formula A) | 18.2 | |
| Tricresyl phosphate | 8.0 | |
| Castor oil | 17.1 | Internal phase |
| Denatured ethyl alcohol | 0.5 | |
| n-Butyl alcohol | 2.2 | |
| n-Butyl acetate | 25.9 | |
| Water | 26.6 | External phase |
| Polyvinyl alcohol | 2.5 | |
| | 100.0% | |

To the above emulsion was added stearato chromic chloride in an amount equal to 50% of the polyvinyl alcohol present.

The solids content of the emulsion was reduced from 45.8% to 40% by weight by dilution with water to give a material suitable for test purposes. Films representing the emulsion with and without the stearato chromic chloride were prepared by casting on glass plates and dried for 30 minutes at 125° C. The films in both instances after drying were tough, coherent and of excellent transparency.

Resistance of these films to ½% soap solution was determined by soaking for 20 minutes at 55° C. After 3 minutes' immersion, the film without the stearato chromic chloride turned white, swelled and softened considerably. A definite loss in adhesion to the glass plate occurred. No further deterioration of the film occurred during the 20 minute test. On drying at room temperature, most of the whitish appearance of the film disappeared and a part of the original adhesion was regained.

During the immersion test the glass plate containing the dried emulsion film treated with stearato chromic chloride showed only a slight change in color and no film-swelling was evident. During the test a slight loss of adhesion occurred but this was not greater than 40% that of the untreated film. Substantially all of the original degree of adhesion returned as the film of the stearato chromic chloride treated emulsion was dried. The use of the complex chromic salt thus greatly improved the water-resistance of the coatings produced from the nitrocellulose emulsion. This pronounced waterproofing effect makes feasible the use of higher concentrations of the hydrophilic polyvinyl alcohol than has been possible heretofore.

The stearato chromic chloride of Examples 1 and 2 was the Werner complex of chromium as described in Example 1 of R. K. Iler, Serial No. 358,479, filed September 26, 1940, now Patent No. 2,273,040. Similar complexes based upon oleic, arachidic, palmitic and similar long chain fatty acids having more than ten carbon atoms function in a similar fashion in the improved emulsion, and while varying somewhat in efficiency, perform an effective waterproofing and hardening of the dry coatings.

*Example 3*

To the unmodified polyvinyl acetate emulsion of Example 1, a Werner complex of chromium, best described as a rosin chromic chloride, in which rosin replaces the stearic acid of the stearato chromic chloride, was added in the form of a 26% solution in ethyl alcohol. The ratio of rosin chromic chloride to polyvinyl alcohol used was 3 to 10.

Films prepared using the rosin complex were found to be as water-resistant as those from the stearato chromic chloride. Thus, it is possible to use Werner complexes of cyclic acids such as abietic as well as those prepared from the higher aliphatic acids.

Other representative monomers from which emulsions of the type of Example 1 can be prepared are styrene, acrylic acid, methacrylic acid, esters of acrylic and methacrylic acid, vinyl chloride, vinyl esters, vinylidene chloride, butadiene, chloroprene and mixtures to secure interpolymers.

In addition to cellulose nitrate, emulsions of cellulose esters and ethers can be greatly improved through the use of the Werner complexes of trivalent chromium. These include cellulose acetate, cellulose butyrate, cellulose propionate, cellulose stearate, and mixed esters. Ethyl cellulose and benzyl cellulose are examples of the cellulose ethers. In the claims the term cellulose derivative refers to such water insoluble, film-forming derivatives.

Natural and synthetic resins, cellulose esters and cellulose ethers in general can be emulsified by dissolving in suitable solvents and dispersing in a water phase containing polyvinyl alcohol. Mechanical dispersions, particularly of thermoplastic polymeric bodies can also be prepared from a variety of natural and synthetic resins. Cellulose derivative emulsions in water-polyvinyl alcohol systems can be modified and greatly improved through the addition of the higher aliphatic and the cyclic acid chromium salt complexes of the Werner type.

Modifiers for the principal polymeric substances can frequently be added by dissolving them in the monomer, by dissolving in the solvents or by other suitable means.

A wide variety of plasticizers can be introduced by methods dependent upon the particular type of emulsion. A necessary requirement is that the plasticizing materials be inherently water-insoluble. Polar emulsifying agents may be required in the preparation of some emulsions to obtain suitable dispersions but in order to secure the maximum possible waterproofing, should be used in very minor amounts.

My emulsions are unusual in that the presence of the hardening, waterproofing agent does not seriously affect their stability. It is a well recognized fact that salts of the di and trivalent metals are powerful de-emulsifying agents. The degree of stability secured when using the organic chromium complexes of the Werner type is unexpected and permits the manufacture, storage and use of the emulsions under a wide variety of conditions. Prior to my invention it had been standard practice to apply the emulsion and to subsequently carry out a waterproofing treatment with materials such as formaldehyde, tannin, chrome alums, chrome salts or basic aluminum acetate. The waterproofing of casein and glue has been quite effective with these agents but they are in the first place inefficient waterproofing agents for polyvinyl alcohol, and in the second place, they are not readily incorporated into emulsion without breaking it or rendering it unstable.

The stearato chromic chloride type waterproofing agent is, in addition to being a highly efficient insolubilizing agent for polyvinyl alcohol, unusual in its compatibility and stability in the water phase of my emulsions. In addition to the primary waterproofing effect, its use gives a film which is highly repellent to wetting, produces a harder film, and improves the adhesion of the coating. All of these things are accomplished without markedly affecting the inherent physical properties of the principal polymeric organic material which has been emulsified.

Many uses of the product of this invention will be apparent from the above description. Such uses include the treatment of wood, paper, textiles and other fabrics of all kinds. The dried films do not necessarily have to be baked or heat cured. Such films are useful in coating materials such as eggs, fruit, vegetables, and many other things of apparently divergent natures.

It is apparent that many widely different embodiments of this invention may be made without departing from the spirit and scope thereof; and, therefore, it is not intended to be limited except as indicated in the appended claims.

I claim:

1. A stable emulsion comprising a water insoluble polymeric organic film-forming material dispersed in a water phase containing an inherently water-soluble polyvinyl alcohol and a water soluble organic complex of the Werner type in which a trivalent chromium atom is coordinated with a carboxylic acido group having at least 10 carbon atoms.

2. A stable emulsion comprising a solution of a water insoluble polymeric organic film-forming material dispersed in a water phase containing an inherently water-soluble polyvinyl alcohol and a water soluble organic complex of the Werner type in which a trivalent chromium atom is coordinated with a carboxylic acido group having at least 10 carbon atoms.

3. A stable emulsion comprising polymerized vinyl acetate dispersed in a water phase containing an inherently water-soluble polyvinyl alcohol and a water soluble organic complex of the Werner type in which a trivalent chromium ion is coordinated with a carboxylic acido group containing at least 10 carbon atoms.

4. A stable emulsion comprising polymerized vinyl acetate dispersed in a water phase containing an inherently water-soluble polyvinyl alcohol and a stearato chromic chloride.

5. A stable emulsion comprising a solution of nitrocellulose dispersed in a water phase containing an inherently water-soluble polyvinyl alcohol and a water soluble organic complex of the Werner type in which a trivalent chromium atom is coordinated with a carboxylic acido group having at least 10 carbon atoms.

6. A stable emulsion comprising a solution of nitrocellulose dispersed in a water phase containing an inherently water-soluble polyvinyl alcohol and a stearato chromic chloride.

7. The composition of claim 3 in which the organic complex of the Werner type is present in an amount of 20% to 70% by weight of that of the polymerized vinyl acetate.

CHARLES B. HEMMING.